Aug. 11, 1925.
T. DE LA MARE
1,549,406
PROCESS FOR MAKING AND LAYING CONCRETE PIPE
Filed Oct. 2, 1923
2 Sheets-Sheet 1
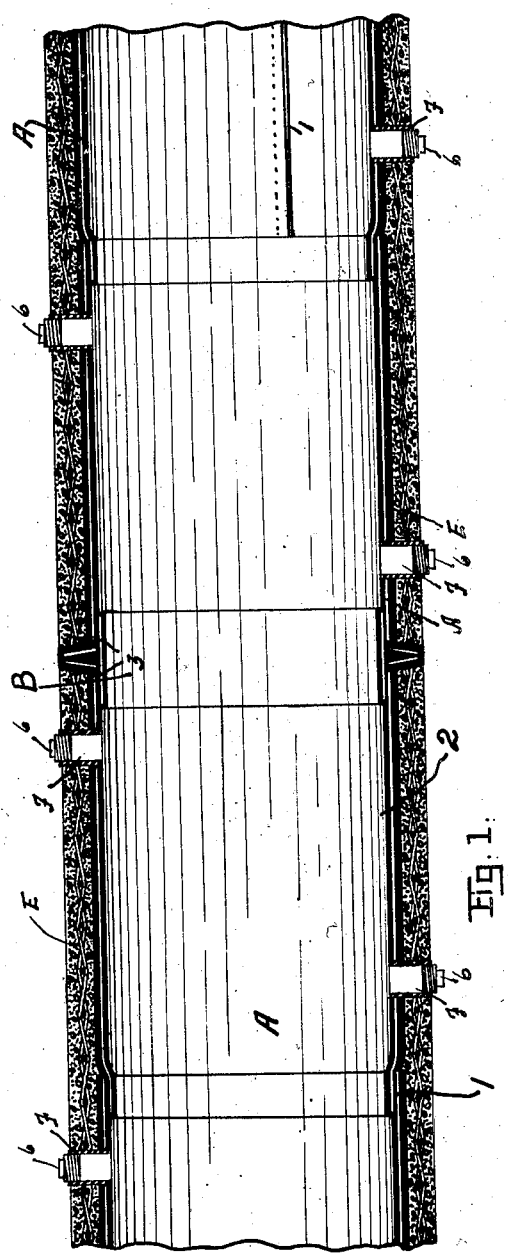
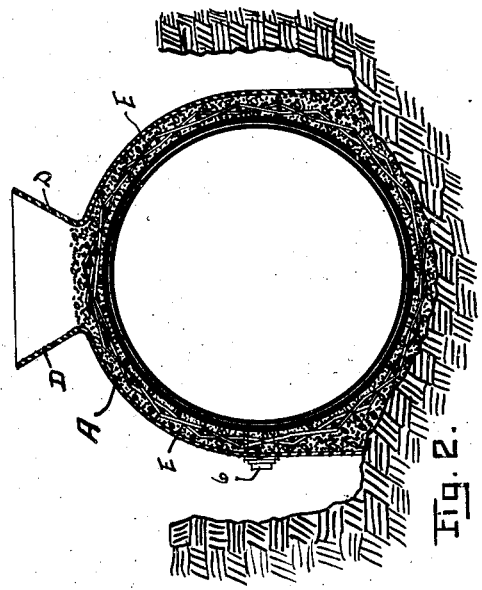
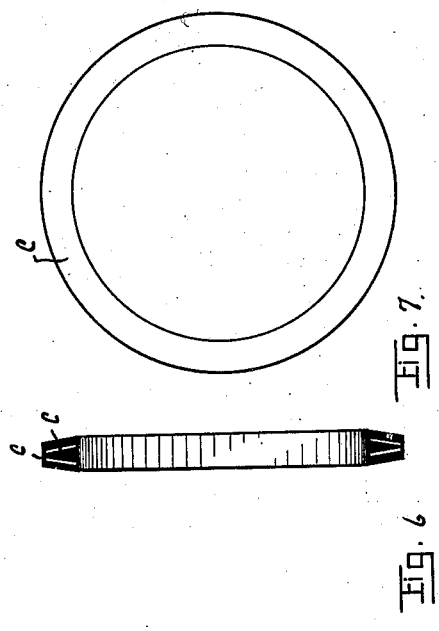
INVENTOR.
Thomas de La Mare
BY
J. M. Thomas
ATTORNEY.

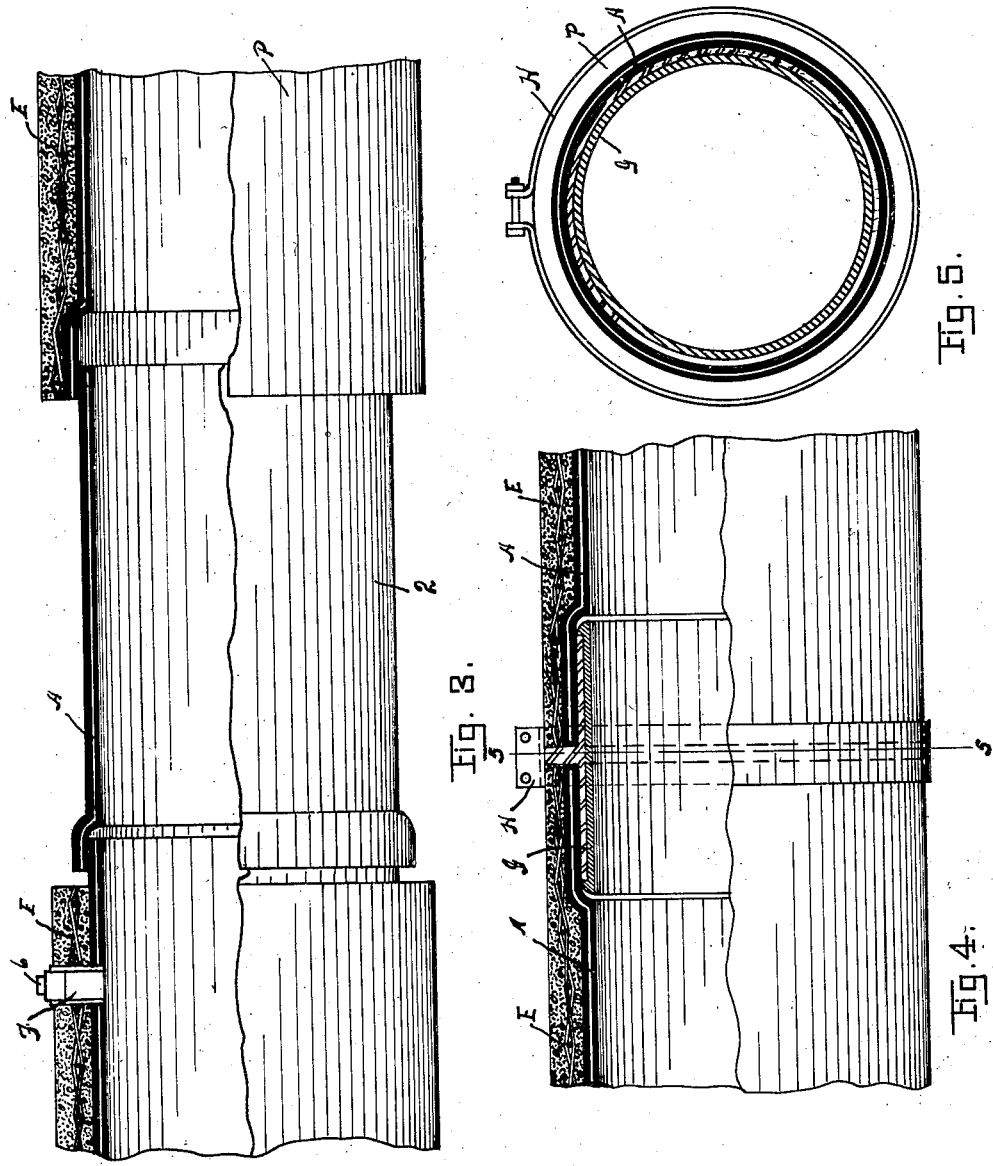

Patented Aug. 11, 1925.

1,549,406

UNITED STATES PATENT OFFICE.

THOMAS DE LA MARE, OF TOOELE, UTAH.

PROCESS FOR MAKING AND LAYING CONCRETE PIPE.

Application filed October 2, 1923. Serial No. 666,214.

*To all whom it may concern:*

Be it known that I, THOMAS DE LA MARE, a citizen of the United States, residing at Tooele, in the county of Tooele and State of Utah, have invented certain new and useful Improvements in Processes for Making and Laying Concrete Pipe, of which the following is a specification.

My invention relates to methods for making concrete pipe, and has for its object to provide an economical method of making and laying in the ground a reenforced continuous concrete pipe.

These objects I accomplish with the method herein described, and illustrated in the accompanying drawings, in which similar letters and numerals of reference indicate like parts and members throughout the several views and as described in the specification forming a part of this application and pointed out in the appended claims.

In the drawings in which I have illustrated substantially my method of making a reenforced continuous concrete pipe, Figure 1 is a longitudinal section of the pipe when laid in continuous length. Figure 2 is a transverse section of the pipe shown in Figure 1 of a reenforced concrete pipe to be laid in a continuous length. Figure 3 is an elevation partly in longitudinal section of a continuous pipe made and cured in a trench. Figure 4 is a longitudinal section of a joint between sections of previously constructed concrete pipe. Figure 5 is a transverse section on line 5—5 of Figure 4. Figure 6 is a pair of opposed annular washers coated with asphalt. Figure 7 is a side elevation of one of the said washers.

In making and laying concrete pipe through which water or other liquid under pressure is to be carried, it is necessary that the pipe shall be reenforced and so constructed that it will allow contraction and expansion, both longitudinally and circumferentially, due to change of temperature, and to allow for contraction when the concrete is setting, and also that the pipe be lined throughout with an impervious lining which is elastic and pliant. The present invention contemplates that pipe made in accordance herewith will be more frequently laid in a trench and under cover; however, I do not confine myself to such use alone. My method of making and laying such pipe consists of the use of a lining A, preferably made of sheet metal or other impervious sheet material, having a lap joint, shown at 1, and made up of sections 2, preferably about five feet in length, and joined together by slipping a portion of one section within another contiguous section, as the common stove pipe. Before the said lining is laid, it is covered both inside and outside with coating of hot asphaltum by dipping said sections 2 of lining pipe A in hot plastic asphaltum or similar material. At about every ten or fifteen feet an asphalt coated sleeve member B, made of similar material to that of said lining A, is used at the meeting ends of two sections 2. Two opposed collar washers C, made of sheet metal and slightly conical and likewise dipped in hot asphaltum, are used as a form surrounding said lining pipe A and spaced apart by the asphaltum coating to allow longitudinal contraction of the concrete when it is placed around the pipe A. The said members 2 are spaced apart on said sleeve member B, preferably about one quarter of an inch to allow for longitudinal expansion, as shown at 3, and the said metal collar band washers C are spaced apart and provided with the asphalt coating between opposed pairs thereof, by which leaks due to longitudinal contraction are prevented. When the pipe is to be made and laid in a trench at other than horizontal, I preferably start at the lower end and lay the lining pipe and, as well, the cement concrete pipe P up the hill or incline, and to economize in cement I use a plurality of side forms D, one on each side of, and spaced from, the said lining pipe A, with ends abutting, and the said lining pipe A is spaced above the bottom of the trench, in order that a concrete receiving space will be provided surrounding said lining pipe A. I place medially in said space a reenforcing member made of coarse meshed screen wire E, and then pour the concrete into said space both inside and outside of said reenforcement member, so that the wire will be imbedded within the concrete portion of my pipe. The sides of said wire screen are overlapped at the upper side and covered with the concrete. When the pipe P is set the side forms D may be removed from the trench, and the trench completely filled up with soil. In order that said completed pipe may be easily tapped for connecting laterals thereto, I insert short gas pipe thimbles F at intervals radially in the sides of said lining pipe A, with portions of said thimbles extended outwardly through the concrete pipe P, and if desired a plug 6 may be screwed in the free or outer end of each of said thimbles F to be replaced with the end of the lateral pipe as desired. After the initial setting of the concrete, water not under pressure may be supplied in said pipe for keeping temperatures even and on the outside for properly curing or setting the concrete. By thus laying and curing my pipe I am able to cure the pipe and back fill the trench, and test for possible leaks much quicker than has heretofore been done. To expedite the construction of my pipe I may divide the work between different crews of workers and when one crew has reached the end of another crew's work, by inserting one of the said pipe sections A in the meeting ends of the two sections of the lining pipe A, then with the reenforcing wire E in place, the concrete which forms the pipe P may be poured, as at any other portion of the work, and pipe made continuous.

If I desire to lay previously prepared pipe having my lining pipe A therein I join the different sections at the joint shown in Figure 4, by inserting sleeve G at the meeting or adjacent ends of the pipes A after it has been dipped in hot asphaltum in said previously prepared concrete pipe, and surrounding the joint with hot asphaltum which is held in place by a band H.

By thus providing an elastic, pliant coating both within and without the lining pipe, and slip joints both longitudinally and circumferentially in said lining pipe, which allows contraction and expansion thereof, and in the concrete portion of my pipe, together with a reenforced concrete outer pipe that is free to contract or expand circumferentially and longitudinally without injury to it or to the lining pipe or to laterals connected therewith, I have overcome the difficulties in making and laying an economical continuous, pressure-resisting concrete pipe.

Having thus described my method for making and laying continuous concrete pipe, I desire to secure by Letters Patent and claim:—

1. A method of making and laying concrete pipe, which consists of coating short sections of metal lining pipe with hot asphalt, and telescoping about two inches of one section within another section which has been similarly coated on both the inside and outside, and continuing said joining of said short sections of lining pipe until another portion of previously joined, coated and laid pipe is reached then joining said two portions of pipe by slipping an asphaltum coated thimble made of sheet metal into the adjacent ends of said two portions, and surrounding said metal lining pipe with coarse meshed wire screening, and then covering said pipe and screening with plastic concrete sufficiently to imbed and cover the said screening.

2. A process for making and laying a continuous reenforced concrete pipe which consists of partially telescoping sections of metal pipe; coating both the inside and outside of said pipe with hot asphalt before joining them; joining said coated and joined metal pipe with a previously laid metal pipe by placing on each of said pipes a sheet metal washer having a frusto-conical form with their bases adjacent; then slipping a thimble of sheet metal pipe which has just been covered with hot asphalt into the end portions of both pipes progressively and retrogressively; surrounding said metal pipes with wire screening; then covering said pipes except at the joint with plastic concrete, and covering the portions of said pipes contiguous the joint and said washers with hot asphalt and retaining the concrete and asphalt in place until each has set.

3. A process for making and laying continuous reenforced concrete pipe, which consists of partially telescoping sections of sheet lining pipe; coating both the inside and outside of said lining pipe with hot asphalt before joining them; surrounding said coated and joined pipe with coarse meshed wire screening; joining said coated, screened and telescoped section of pipe with another portion of the contemplated continuous pipe having a similar lining pipe protruding therefrom by placing around the two adjacent sections of both lining pipes two conical sheet metal washers, one on each pipe and with their bases adjacent; then slipping a sheet metal thimble which has just been coated with hot asphalt into each pipe overlapping the joint progressively and retrogressively; and then surrounding said lining pipe with plastic concrete except at the joint and covering the junction portion and the said washers with hot asphalt and avoid use until both the concrete and asphalt have set.

In testimony whereof I have affixed my signature.

THOMAS DE LA MARE.